US007889252B2

(12) United States Patent
Tamura et al.

(10) Patent No.: US 7,889,252 B2
(45) Date of Patent: Feb. 15, 2011

(54) IMAGE PROCESSING DEVICE, NON-CAPTURE COLOR SIGNAL CALCULATING DEVICE, AND IMAGE PROCESSING METHOD

(75) Inventors: Masashi Tamura, Tokyo (JP); Narihiro Matoba, Tokyo (JP); Hiroaki Sugiura, Tokyo (JP); Tetsuya Kuno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 821 days.

(21) Appl. No.: 11/791,762

(22) PCT Filed: Nov. 30, 2004

(86) PCT No.: PCT/JP2004/017769

§ 371 (c)(1),
(2), (4) Date: May 29, 2007

(87) PCT Pub. No.: WO2006/059365

PCT Pub. Date: Jun. 8, 2006

(65) Prior Publication Data

US 2008/0043131 A1    Feb. 21, 2008

(51) Int. Cl.
*H04N 3/14* (2006.01)
*H04N 5/335* (2006.01)
*H04N 9/04* (2006.01)

(52) U.S. Cl. ................... 348/272; 348/273; 348/274; 348/277; 348/278; 348/279

(58) Field of Classification Search ................ 348/272, 348/273, 274, 277–280; 382/162, 164, 300
See application file for complete search history.

(56) References Cited

U.S. PATENT DOCUMENTS 5,396,441 A    3/1995  Ozawa
5,552,827 A    9/1996  Maenaka et al.

(Continued)

FOREIGN PATENT DOCUMENTS

JP          3-124190 A        5/1991

(Continued)

OTHER PUBLICATIONS

Ishikawa et al.,Matsushita Techno Research, Inc., "National Technical Report", vol. 31, No. 1, Feb. 1985, pp. 76-82.

(Continued)

*Primary Examiner*—Yogesh K Aggarwal
(74) *Attorney, Agent, or Firm*—Birch, Stewart, Kolasch and Birch, LLP (57) ABSTRACT

An image processing device includes a first calculation means for calculating a non-capture color signal corresponding to an H-th interpolation color for a pixel of interest, a second calculation means for calculating a non-capture color signal by multiplying a J-th capture color signal corresponding to the capture color for the pixel of interest by the ratio of the H-th two-dimensional low-pass filter output to the J-th two-dimensional low-pass filter output, and a third calculation means for calculating a non-capture color signal corresponding to the H-th interpolation color for the pixel of interest using the calculation result according to the first calculation means and the calculation result according to the second calculation means.

9 Claims, 8 Drawing Sheets

U.S. PATENT DOCUMENTS

2003/0048279 A1 3/2003 Kok et al.
2003/0095703 A1 5/2003 Hsia et al.

FOREIGN PATENT DOCUMENTS

| JP | 05-056446 A | 3/1993 |
|---|---|---|
| JP | 7-236147 A | 9/1995 |
| JP | 11-220749 A | 8/1999 |
| JP | 11-243554 A | 9/1999 |
| JP | 2000-165894 A | 6/2000 |
| JP | 2001-78211 A | 3/2001 |
| JP | 2001-320720 A | 11/2001 |

OTHER PUBLICATIONS

Color Demosaicing with Constrained Buffering, pp. 52-55, Aug. 13-16, 2001.

| R LPF | R LPF | R LPF | R LPF | R LPF |
|---|---|---|---|---|
| R LPF | R LPF | R LPF | R LPF | R LPF |
| R LPF | R LPF | R LPF | R LPF | R LPF |
| R LPF | R LPF | R LPF | R LPF | R LPF |
| R LPF | R LPF | R LPF | R LPF | R LPF |

Fig. 6

| G LPF | G LPF | G LPF | G LPF | G LPF |
|---|---|---|---|---|
| G LPF | G LPF | G LPF | G LPF | G LPF |
| G LPF | G LPF | G LPF | G LPF | G LPF |
| G LPF | G LPF | G LPF | G LPF | G LPF |
| G LPF | G LPF | G LPF | G LPF | G LPF |

IMAGE PROCESSING DEVICE, NON-CAPTURE COLOR SIGNAL CALCULATING DEVICE, AND IMAGE PROCESSING METHOD

TECHNICAL FIELD

The invention relates to means for obtaining from each photoelectric transducer pseudo signal levels of R, G, and B colors, in which one kind of color filter for any of red (R color), green (G color), and blue (B color) is attached on each photoelectric transducer, a two-dimensional image capture device (hereinafter referred to as an image capture device) composed of photoelectric transducers two-dimensionally arranged as pixels for forming images is used, and color signals that cannot be obtained from each photoelectric transducer (interpolation colors) regarding image information obtained by imaging are calculated using color signals of the same color obtained from other photoelectric transducers arranged around that photoelectric transducer.

BACKGROUND ART

Figure 10:
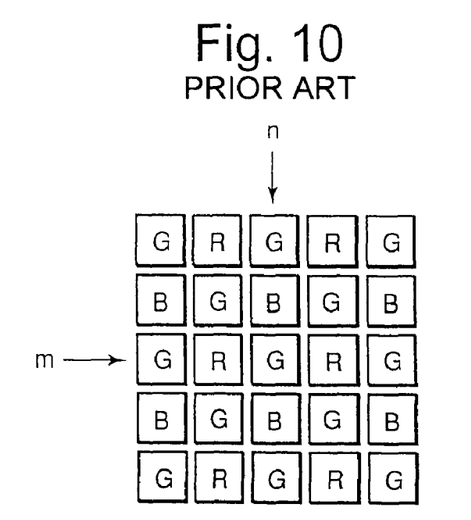
FIG. 10 is a diagram illustrating an example in which primary color filters are arranged in a Bayer pattern alignment, which is general as an image capture device.

In an image input device using CCDs (charge coupled devices) as an image capture device, a method has been used for obtaining from each photoelectric transducer pseudo signal levels of R, G, and B colors, in which one kind of color filter for any of red (R color), green (G color), and blue (B color) is attached on each photoelectric transducer, an image capture device composed of photoelectric transducers two-dimensionally arranged as pixels for forming images is used, and color signals that cannot be obtained from each photoelectric transducer (interpolation colors) regarding image information obtained by imaging are calculated using color signals of the same color obtained from other photoelectric transducers arranged around that photoelectric transducer. FIG. 10 illustrates an example in which photoelectric transducers are arranged in a general Bayer pattern alignment. In addition, each photoelectric transducer is in charge of each pixel of an image captured by an image capture device. Moreover, the color of a pixel in the position at row m and column n depends on a signal (a capture color signal) obtained from the photoelectric transducer disposed in the position.

Figure 11:
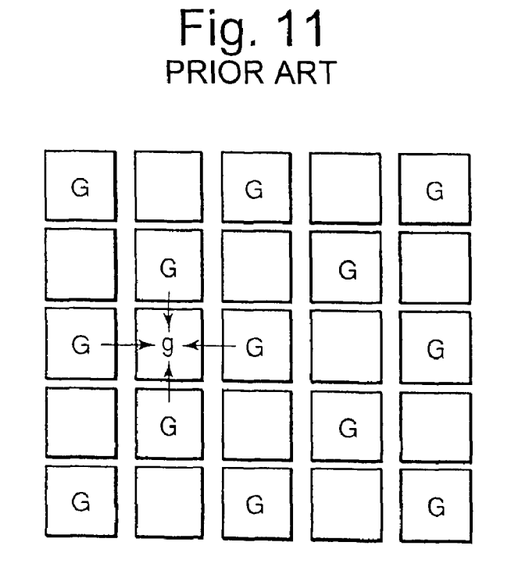
FIG. 11 is a diagram illustrating an example of generating "g" by linear interpolation.
Figure 12:
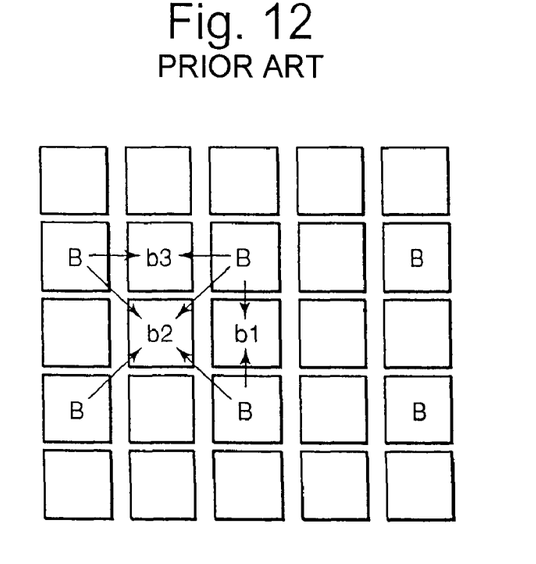
FIG. 12 is a diagram illustrating an example of generating "b" by linear interpolation.
Figure 13:
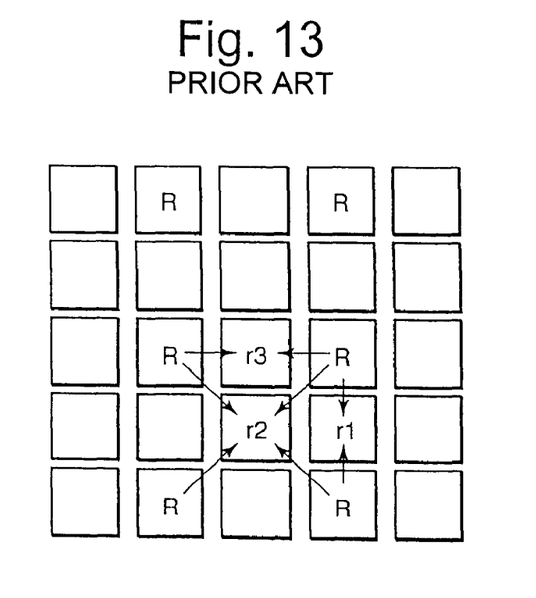
FIG. 13 is a diagram illustrating an example of generating "r" by linear interpolation.

As a method of obtaining a color image from image information obtained from the image capture device by performing color signal interpolation, a conventional linear interpolation method will be described (hereinafter referred to as a conventional technology 1). Only one kind of color signal (capture color signal) can be obtained from one photoelectric transducer. Signals of other colors that cannot be obtained from the one photoelectric transducer (non-capture color signals) are generated from output signals from other photoelectric transducers arranged therearound that output signals of the same color as the non-capture color signal. Here, if signals of G color are focused on, G signals obtained by capturing (expressed in capital letters "G") are present at positions illustrated in FIG. 11. For a pixel of interest, for which a color signal is generated by interpolation, the mean value is calculated by the linear interpolation method from signals of four adjacent pixels on the right, left, top, and bottom, of the pixel of interest, to generate a G signal for a pixel for which no G signal is present (expressed in a small letter "g"), whereby G signals for all the pixels can be obtained. Meanwhile, if B signals are focusing on, as illustrated in FIG. 12, a signal b1 is generated from B signals of two upper and lower adjacent pixels, a signal b2 is generated from B signals of four adjacent pixels on the right, left, top, and bottom, and a signal b3 is generated from B signals of two right and left adjacent pixels, whereby B signals for all the pixels are individually obtained by the linear interpolation method or the like. Regarding R signals, as illustrated in FIG. 13, signals for all the pixels can be interpolated according to the same method as that for B signals. According to the above-described methods, R, G, and B signals for all the pixels can be obtained (a low-pass filter, for example, can be used for the linear interpolation).

However, there has been a problem in that the method in the conventional technology 1 cannot achieve sufficient resolutions, and false colors that are not present in the original subject are generated in edge portions in the image. This results from the fact that a single-color filter is disposed, on each pixel to take images. More specifically, because a single-color filter is disposed on each pixel to take images, spatial frequency characteristics and phases are various, so that the linear interpolation method in the conventional technology 1 cannot sufficiently restore high-frequency components, whereby resolutions corresponding to the number of pixels cannot be achieved for any of R, G, and B colors.

In order to resolve such a problem, the applicant has filed an application of Japanese Patent Laid-Open No. 56446/1993 hereinafter referred to as a conventional technology 2) on a method of performing color interpolation using color correlativity with high resolutions while suppressing false colors sufficiently. Hereinafter, the conventional technology 2 will be described.

In FIG. 10, when a pixel of interest is at a position of G at row m and column n, a method of calculating R and B signal levels is performed by calculating the ratio of signal change between different colors as in Formula 1 and Formula 2 (the ratio of $R_{LPF}$ to $G_{LPF}$ in Formula 1, and the ratio of $B_{LPF}$ to $G_{LPF}$ in Formula 2). Here, $R_{LPF}$ means an LPF output value, which is an output value when an R signal is inputted to a low-pass filter (LPF), $G_{LPF}$ means an LPF output value of a G signal, and $B_{LPF}$ means an LPF output value of a B signal. G(m, n) means a capture color signal, which is an output signal obtained by being actually captured by a photoelectric transducer at the position of the G pixel of interest among the capturing pixels. R(m, n) means a signal value of an interpolation color R calculated for the G position, and B(m, n) means a signal value, of an interpolation color B calculated for the G position. Those R(m, n) and B(m, n) can be calculated using G(m, n), which is an actually-imaged capture color signal, according to the following Formula 1 and Formula 2. In addition, the G(m, n) is also referred to as a reference color because the G(m, n) is a color that is referred to in calculating the R(m, n) and the B(m, n).

[Expression 1]

$$R(m, n) = G(m, n) \times \frac{R_{LPF}}{G_{LPF}} \quad \text{(Formula 1)}$$

[Expression 2]

$$B(m, n) = G(m, n) \times \frac{B_{LPF}}{G_{LPF}} \quad \text{(Formula 2)}$$

By generalizing Formula 1 or Formula 2, given that a capture color of a pixel of interest is expressed as a color J, and the position is expressed as (m, n), a calculation method of generating by interpolation a color H, which is a kind of color different from the color J, as an interpolation color for the position (m, n) is expressed in Formula 3.

[Expression 3]

$$H(m, n) = J(m, n) \times \frac{H_{LPF}}{J_{LPF}} \quad \text{(Formula 3)}$$

Figure 14:
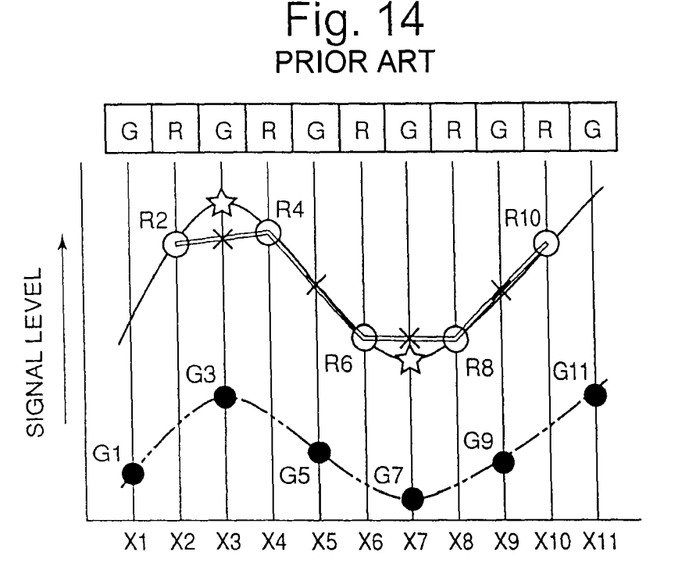
FIG. 14 is a schematic diagram when generating by interpolation R colors at positions of pixel on which G color filters are present.

The method according to the conventional technology 2 utilizes a general feature of captured images that variations in color signals are less than variations in luminance signals, in other words, there are areas in which color correlativity is high between different colors. FIG. 14 is a schematic diagram when generating by interpolation using Formula 3 an R color at the position of a pixel on which a G color filter is present. The diagrams illustrates a case in which a one dimensional image capture device is considered for simplifying explanation. In the diagram, signals indicated by black circles or white circles express the levels of signals of each color, actually captured by the image capture device. A chart in chain double-dashed line expresses a signal variation in the signal of the G color, which is a reference color, and a chart in solid line expresses a desired signal variation in the R color signal that would be correctly interpolated at positions of pixels on which G-color filters are present. In the diagram, R color signals generated by interpolation using the linear interpolation method in the conventional technology 1 are generated as signal levels indicated by the x marks on the double line. In this case, in areas in which variations in the signal level are slow, appropriate signal level values are generated without problems. However, in edge areas of images in which variations in the signal level are precipitous, color signals to be interpolated cannot be sufficiently recreated, so that signal changes between colors are unbalanced, whereby the color signals are perceived as false colors that are originally not present. In the meanwhile, color signals generated when interpolation colors are interpolated using the method in the conventional technology 2 are recreated as signal levels indicated by star marks in the diagram. Therefore, full-color images obtained by sufficiently recreating edges in the images have high resolutions and high qualities while including less false colors.

Figure 15:
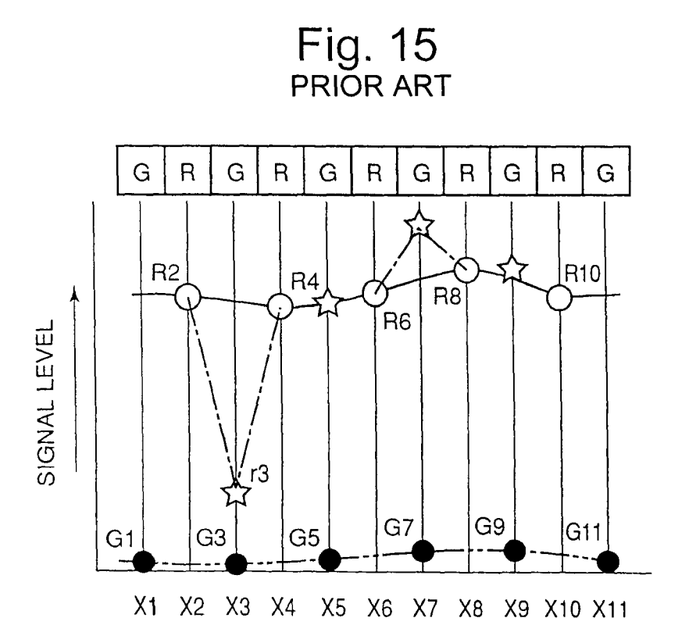
FIG. 15 is a schematic diagram when generating by interpolation R colors at positions of pixels on which G color filters are presents.

However, in the method in the conventional technology 2, because the rate of local change in signal levels of the reference color is used in obtaining interpolation colors, specific deterioration in image quality sometimes arises. FIG. 15 is a schematic diagram illustrating a case in which deterioration in images quality arises by performing color interpolation using the method in the conventional technology 2. As illustrated in the diagram, in a case in which LPF output values of referenced signal levels are small, the sensor output signal varies due to dark noise or the like, and LPF output values of signal levels to be generated by interpolation are high, in other words, in chromatic color areas, the interpolated color signal largely varies in proportion to variation in the reference color signal, so that black spots or white spots that are not present in the original image are sometimes generated in pixels of interest.

For example, assuming an imaging device in which R, G, and B signals are expressed by 10 bits each (in the range from 0 through 1023; 0: dark, 1023: bright), and given that local signal levels are G1=4, G3=1, G5=4, and R2=R4=1023 in FIG. 15, and that each LPF value is calculated by simple averaging, the calculation in Formula 3 is performed specifically by the calculations in Formula 4 through Formula 6.

[Expression 4]

$$G_{LPF}=(4+1+4)/3=3 \quad \text{(Formula 4)}$$

[Expression 5]

$$R_{LPF}=(1023+1023)/2=1023 \quad \text{(Formula 5)}$$

[Expression 6]

$$r3=G3 \times R_{LPF}/G_{LPF}=1 \times 1023/3=341 \quad \text{(Formula 6)}$$

Therefore, the generated interpolation signal value r3 is an extremely small value compared with signal levels of pixels of the same color arranged therearound. More specifically, although the conventional technology 2 is an effective method with a high image quality and less false colors as a method of interpolating color signals in an imaging device with an image capture device, there has been a problem in that method-specific image quality deterioration is caused depending on effects of noise characteristic of sensors or on imaged pictures.

Patent document 1: Japanese Patent Laid-Open No. 56446/1993

Patent document 2: Japanese Patent Laid-Open No. 078211/2001

Patent document 3: Japanese Patent Laid-Open No. 165894/2000

Non-patent document 1: "National Technical Report" (Vol. 31; No. 1, February 1985), published by Matsushita Techno Research, Inc., released by Ohmsha, Ltd.

DISCLOSURE OF THE INVENTION

Problem that the Invention is to Solve

When only the conventional technology 1 is used, there has been a problem in that sufficient resolutions of images cannot be achieved, so that false colors that are not present in the original subject are generated in edge portions in the images, and when only the conventional technology 2 is used, there has been a problem in that black spots or white spots that are not present in the original image are sometimes generated.

Means for Solving the Problem

In order to achieve such objects, in an image processing device for obtaining images from an image capture device in which photoelectric transducers, each having any one among first through N-th spectral sensitivity curves in a group of N spectral sensitivity curves, are arranged in a two-dimensional plane, the image processing device includes a first calculations means for calculating based on capture color signals for pixels surrounding a pixel of interest, outputted from those photoelectric transducers having an H-th spectral sensitivity curve, a non-capture color signal corresponding to an H-th interpolation color for the pixel of interest; a second calculation means for calculating a non-capture color signal corresponding to the H-th interpolation color for the pixel of interest by inputting capture color signals from the photoelectric transducers to two-dimensional low-pass filters to obtain two-dimensional low-pass filter outputs, and multiplying a signal for a J-th capture color, corresponding to the capture color of the pixel of interest by the ratio of the H-th two-dimensional low-pass filter output for the pixel of interest to the J-th two-dimensional low-pass filter output for the pixel of interest; and a third calculation means for calculating a non-capture color signal corresponding to the H-th interpolation color the pixel of interest using the calculation result from the first calculation means and the calculation result from the second calculation means.

EFFECTS OF THE INVENTION

According to the present invention, in an image processing device for obtaining images from an image capture device in which photoelectric transducers, each having any one among first through N-th spectral sensitivity curves in a group of N spectral sensitivity curves, are arranged in a two-dimensional plane, the image processing device includes a first calculation means for calculating based on capture color signals for pixels surrounding a pixel of interest, outputted from those photoelectric transducers having an H-th spectral sensitivity curve, a non-capture color signal corresponding to an H-th interpolation color for the pixel of interest; a second calculation means for calculating a non-capture color signal corresponding to the H-th interpolation color for the pixel of interest by inputting capture color signals from the photoelectric transducers to two-dimensional low-pass filters to obtain two-dimensional low-pass filter outputs, and multiplying a signal for a J-th capture color, corresponding to the capture color of the pixel of interest by the ratio of the H-th two-dimensional low-pass filter output for the pixel of interest to the J-th two-dimensional low-pass filter output for the pixel of interest; and a third calculation means for calculating a non-capture color signal corresponding to the H-th interpolation color for the pixel of interest using the calculation result from the first calculation means and the calculation result from the second calculation means; so that an imaging device of high practical use that can well suppress image quality deterioration while achieving effects of the conventional technology 1 and the conventional technology 2 can be realized.

BRIEF DESCRIPTION OF DRAWINGS

FIG. 2 is a diagram illustrating a situation in which R signals are written in a two-dimensional memory 6a.

FIG. 5 is a diagram illustrating outputs of a two-dimensional LPF 7a.

DESCRIPTION OF THE SYMBOLS

1: lens
2: image capture device
3: A/D
4: frame memory
5: multiplexer
6a through 6c: two-dimensional memories
7a through 7c: two-dimensional LPFs
8: computing circuit
9: coefficient computing circuit
10: register

BEST MODE FOR CARRYING OUT THE INVENTION

Embodiment 1

Figure 1:
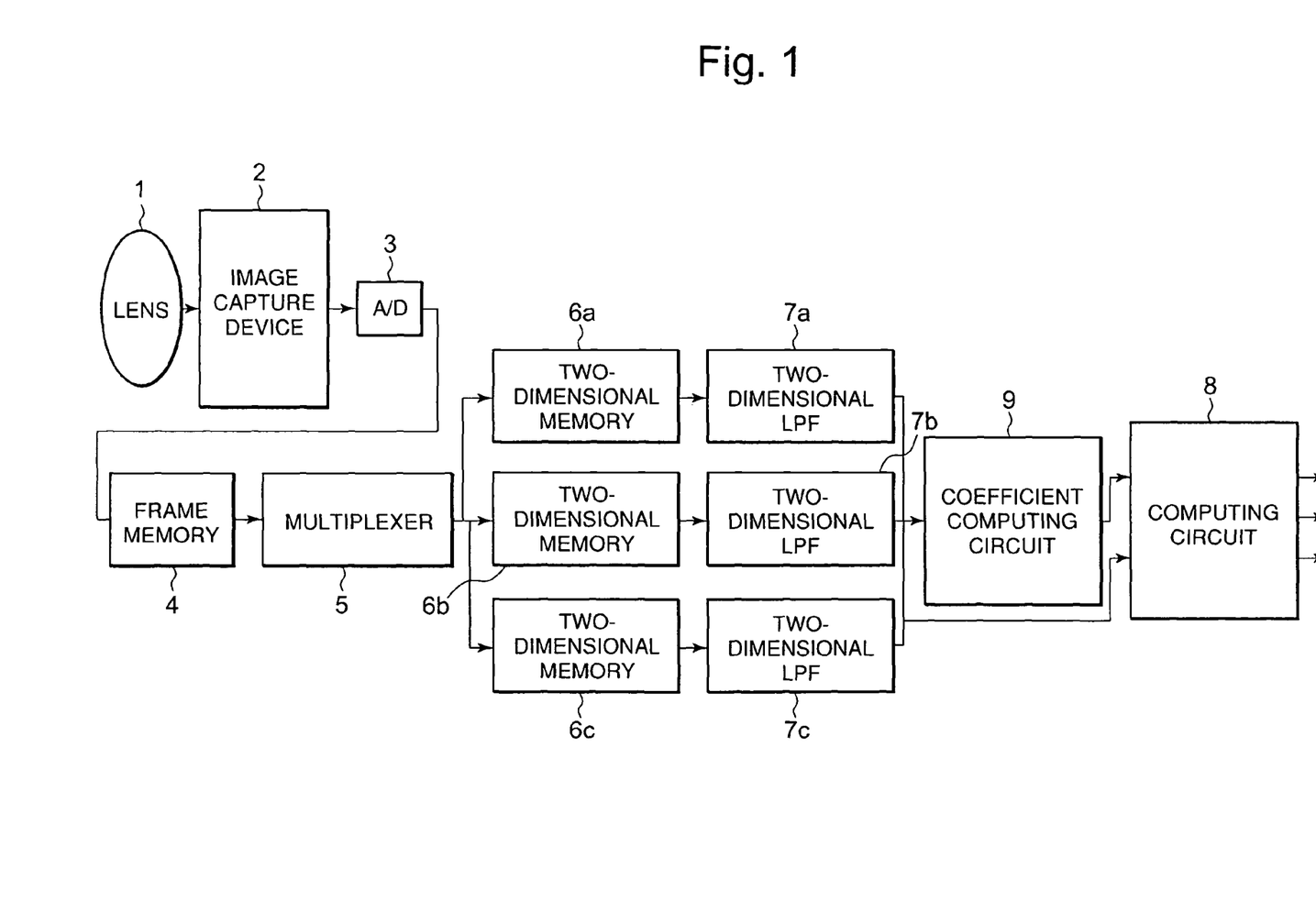
FIG. 1 is an entire block diagram in Embodiment 1 of the present invention.

Hereinafter, Embodiment 1 of the present invention will be described in reference to drawings. FIG. 1 is an entire block diagram illustrating Embodiment 1 of the present invention. A case will be described in which, using an image capture device composed by arranging in a Bayer pattern photoelectric transducers on which color filters of three primary colors—R color, G color, and B color—are attached at digital still image composed of R, G, and B signals each expressed by 10 bits is realized by a digital still camera.

In FIG. 1, numeral 1 denotes a lens for collecting light incident from a subject; numeral 2 denotes an image capture device for photoelectric-converting the incident light through the lens; numeral 3 denotes A/D converter for converting analog image signals outputted from the image capture device into digital image signals; numeral 4 denotes a frame memory for temporarily storing digital image signals for one frame; numeral 5 denotes a multiplexer for separating R, G, and B signals from image data in the frame memory 4 in accordance with pixel positions; numerals 6a through 6c denote two-dimensional, memories corresponding to R, G, and B signals, respectively; numerals 7a through 7c denote low-pass filters (hereinafter referred to as LPFs) corresponding to R, G, and B signals, respectively; numeral 8 denotes a computing circuit for calculating non-capture color signals in pixels of interest in reference to LPF output values of the colors; and numeral 9 denotes a coefficient computing circuit for calculating from output values of the two-dimensional LPFs 7a through 7c later-described interpolation strength coefficient value K (hereinafter referred to as a coefficient K).

Figure 2:
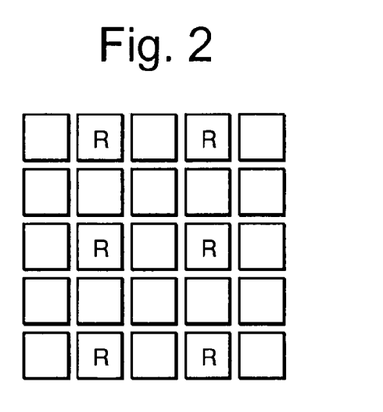
Figure 3:
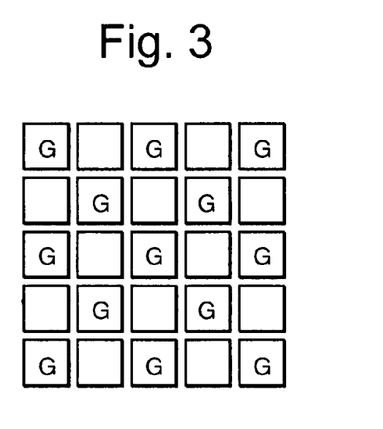
FIG. 3 is a diagram illustrating a situation in which G signals are written in a two-dimensional memory 6b.
Figure 4:
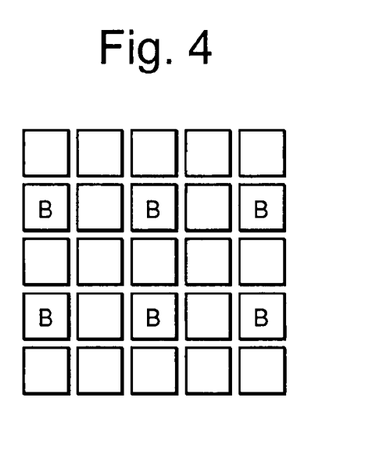
FIG. 4 is a diagram illustrating a situation in which B signals are written in a two-dimensional memory 6c.
Figure 5:
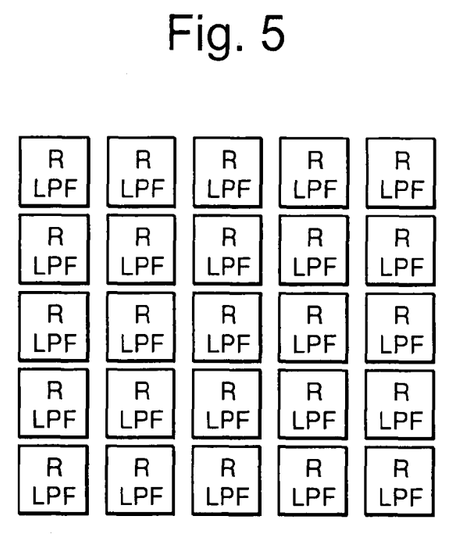
Figure 6:
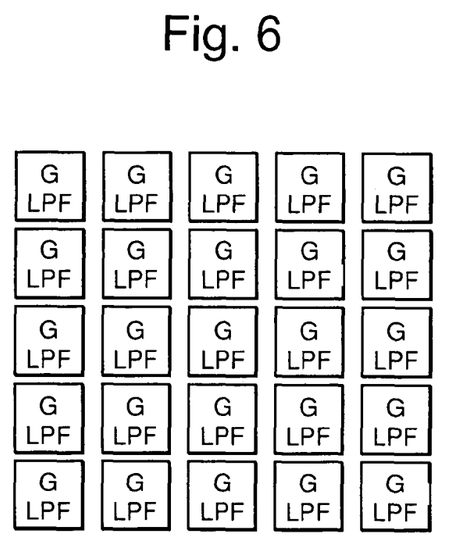
FIG. 6 is a diagram illustrating outputs of a two-dimensional LPF 7b.
Figure 7:
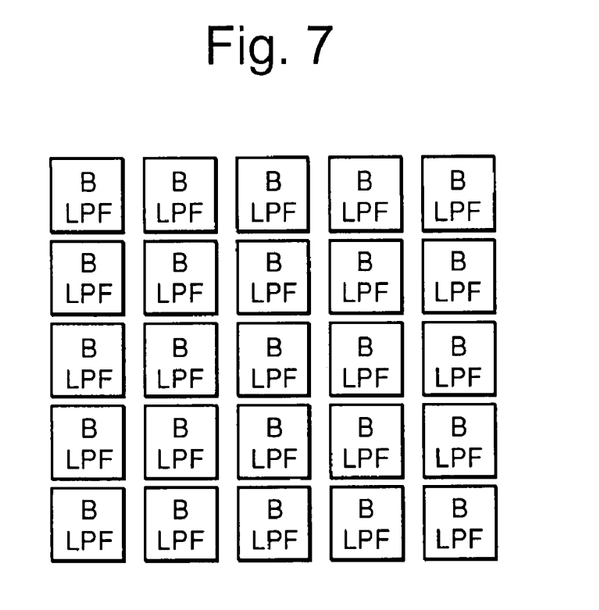
FIG. 7 is a diagram illustrating outputs of a two-dimensional LPF 7c.

Next, the operation will be described. In FIG. 1, light incident from the lens 1 is focused onto the image capture device 2. The image capture device 2 photoelectric converts the incident light, which is outputted as analog electrical signals. The outputted analog electrical signals are converted by the A/D converter 3 into digital electrical signals, which are inputted into the frame memory 4. Image signals accumulated in the frame memory 4 are transmitted in series to the multiplexer 5 by a control means not shown in the figure, and distributed by the multiplexer 5 to each of the colors, and each signal of R, G, and B color signals is separately written in the two-dimensional memories 6a through 6c, respectively. A situation in which significant image signals for each color are written in the two-dimensional memories 6a through 6c is illustrated in FIG. 2 through FIG. 4. The image signals illustrated in the figures are smoothed by passing through the LPFs 7a through 7c. Specifically, the LPFs output linearly interpolated signals, which are for example mean values of image signals for pixels surrounding pixels of interest in each of FIG. 2 through FIG. 4. The output signals of the two-dimensional LPFs 7a through 7c are illustrated in FIG. 5 through FIG. 7. The LPF output values of the R, G, B colors, outputted from the two-dimensional LPFs 7a through 7c, are inputted to the coefficient computing circuit 9.

Next, the coefficient computing circuit 9 will be described. For example, when an interpolation color of G color for a pixel on which an R color filter is placed for imaging (hereinafter referred to as an R pixel position) is generated, the coefficient computing circuit 9 calculates the coefficient K according to Formula 7 from an LPF output value $R_{LPF}$ calculated from R-color pixels arranged therearound, which is the capture color, from an LPF output value $G_{LPF}$ calculated from G-color pixels arranged therearound, and from a signal value $R_R$ of R color, which is a capture color captured in the pixel of interest (reference color).

[Expression 7]

$$K = \frac{(Dr - |R_R - R_{LPF}|) \times |R_{LPF} - G_{LPF}|}{Dr^2} \quad \text{(Formula 7)}$$

Here, the variable Dr means the dynamic range of input image signals. Dividing the right side by $Dr^2$ normalizes the scope of the coefficient K as $0 \leq K \leq 1$. In addition, regarding the first term (left term) for the multiplication in the numerator in Formula 7, by calculating the absolute value of the difference between the signal value $R_R$ of R color and the LPF output, value $R_{LPF}$ of R color for the pixel of interest, level of irregularity of the capture color for the pixel of interest (the signal level difference between the signal level of the capture color for the pixel of interest and the two-dimensional low-pass filter output signal level of the capture color for the pixel of interest) is calculated, and is subtracted from the dynamic range Dr, whereby the first term is so defined that the smaller the level of irregularity of the capture color for the pixel of interest, the larger the value of the first term, and the larger the level of irregularity of the capture color, the smaller the value of the first term.

Moreover, in the second term (right term) of the multiplication in the numerator in the formula, by calculating the absolute value of the difference between the LPF output value $R_{LPF}$ of R color and the LPF output value $G_{LPF}$ of G color (the difference between an output from an H-th two-dimensional low-pass filter for the pixel of interest and an output from a J-th two-dimensional low-pass filter for the pixel of interest), the color difference (degree of color tone) for the pixel of interest is calculated, and the second term is so defined that the larger the color difference, the larger the second term value, and the smaller the color difference, the smaller the second term value.

Namely, the smaller the level of irregularity of the capture color for the pixel of interest and the larger the color difference (in a case in which the signal level difference between the signal level of the capture color for the pixel of interest and the signal level of the two-dimensional low-pass filter output of the capture color for the pixel of interest is small, and the difference between the two-dimensional low-pass filter output of the capture color for the pixel of interest and the two-dimensional low-pass filter output of the interpolation color for the pixel of interest is large), the larger the coefficient K in Formula 7. In the meanwhile, the larger the level of irregularity of the capture color for the pixel of interest and the smaller the color difference (in a case in which the signal levels difference between the signal level of the capture color for the pixel of interest and the signal level of the two-dimensional low-pass filter output of the capture color for the pixel of interest is large, and the difference between the two-dimensional low-pass filter output of the capture color for the pixel of interest and the two-dimensional low-pass filter output of the interpolation color for the pixel of interest is small), the smaller the coefficient K. Next, using the coefficient K calculated according to Formula 7, a G component value $G_R$ for the pixel of interest is calculated according to Formula 8.

[Expression 8]

$$G_R = G_{LPF} \times \frac{R_R \times (1 - K) + R_{LPF} \times K}{R_{LPF}} \quad \text{(Formula 8)}$$

In Formula 8, in a case in which the coefficient K is small as typified by the case of K=0, for example, a contribution from the color interpolation computation in Formula 3 described in the conventional technology 2 is large. In the meanwhile, in a case in which the coefficient K is large as typified by the case of K=0, for example, the $G_R$ comes close to the LPF output value $G_{LPF}$ of G color, so as to be close to the color interpolation result by the linear interpolation method explained in the conventional technology 1.

Here, given that the capture color of the pixel of interest is J, the position of the pixel of interest is (m, n), and the interpolation color is H, a coefficient computing equation generalizing Formula 7 is expressed in Formula 9, and an interpolation color signal computing equation generalizing Formula 8 is expressed in Formula 10.

[Expression 9]

$$K = \frac{(Dr - |J_{(m,n)} - J_{LPF}|) \times |J_{LPF} - H_{LPF}|}{Dr^2} \quad \text{(Formula 9)}$$

[Expression 10]

$$H_{(m,n)} = H_{LPF} \times \frac{J_{(m,n)} \times (1 - K) + J_{LPF} \times K}{J_{LPF}} \quad \text{(Formula 10)}$$

Here, the J and H expressing colors exclusively correspond to one of the color components of R, G, and B.

From the above explanations, it can be understood that, when a large difference is present between LPF output values of the capture color J and of the interpolation color H for the pixel of interest, the coefficient K in Formula 9 is large (comes close to 1), whereby $H_{(m, n)}$ to be generated takes a value that is close to $H_{LPF}$. Namely, in this case, without depending on the capture color J, the color component $H_{(m, n)}$ to be generated comes close to the result of linear interpolation from pixel values of the same color pixels arranged therearound, whereby there is a benefit in that image quality deterioration illustrated in FIG. 15 is prevented.

In addition, even if the LPF output values of the reference color J and of the interpolation color H largely differ with each other, when level of irregularity of the capture color for the pixel of interest is large, it is believed that signal change of the capture color is not an effect of noise, but a portion constituting an edge in the image. In this case, because the first term of the multiplication in the numerator in Formula 9 is a small value, the coefficient K gets smaller, so that the (1−K) term in Formula 10 gets larger compared with the K term, and contributions from the interpolation method in Formula 3 described in Japanese Patent Laid-Open No. 56446/1993 increase. There is a benefit in that reproduction of the peak in FIG. 14 is made possible, and higher resolution and reduction of false colors can be achieved.

Effectiveness of the method will be specifically described. Assuming that G1=4, G3=1, G5=4, and R2=R4=1023 as signal levels expressed by 10 bits, and that each LPF value is calculated by simple averaging, the R signal value of the pixel of interest is calculated according to Formula 9, and Formula 10 (see FIG. 15). Specifically, computations according to Formula 11 through Formula 14 are performed.

[Expression 11]

$$G_{LPF} = (4+1+4)/3 = 3 \qquad \text{(Formula 11)}$$

[Expression 12]

$$R_{LPF} = (1023+1023)/2 = 1023 \qquad \text{(Formula 12)}$$

[Expression 13]

$$\begin{aligned} K &= (1024 - |1-3|) \times 3 - 1023/1024^2 \\ &= 1022 \times 1020/1024^2 \\ &= 0.994 \end{aligned} \qquad \text{(Formula 13)}$$

[Expression 14]

$$\begin{aligned} R_G &= 1023 \times \{1 \times (1-0.994) + 3 \times 0.994\}/3 \\ &= 1018 \end{aligned} \qquad \text{(Formula 14)}$$

Therefore, unlike the case of the method in the conventional technology 2, the level of the generated interpolation signal value R is comparable to signal levels of the same color pixels arranged therearound, so that in chromatic color areas, image quality deterioration such as black spots and white spots is prevented from being extremely generated.

Next, assuming that G1=20, G3=100, G5=30, and R2=R4=700, and that each LPF value is calculated by simple averaging the R signal value of the pixel of interest is calculated according to Formula 9 and Formula 10 (see FIG. 14). Specifically, computations according to Formula 15 through Formula 18 are performed.

[Expression 15]

$$G_{LPF} = (20+100+30)/3 = 50 \qquad \text{(Formula 15)}$$

[Expression 16]

$$R_{LPF} = (700+700)/2 = 700 \qquad \text{(Formula 16)}$$

[Expression 17]

$$\begin{aligned} K &= (1024 - |100-50|) \times |50-700|/1024^2 \\ &= 974 \times 650/1024^2 \\ &= 0.603 \end{aligned} \qquad \text{(Formula 17)}$$

-continued

[Expression 18]

$$\begin{aligned} R_G &= 700 \times \{100 \times (1-0.603) + 50 \times 0.603\}/50 \\ &= 977 \end{aligned} \qquad \text{(Formula 18)}$$

Therefore, the generated interpolation signal value R forms a distinct peak compared with adjacent pixels of the same color (R2=700 and R4=700) as a result, and is reproduced so as to be convex upward following the level of irregularity of the capture color G, so that color interpolation with a high resolution and less false colors can be realized as well as the method described in the conventional technology 2. In addition, when the $R_R$ is calculated according to the conventional technology 1, the result is $R_R = R_{LPF} = 700$.

Using the above-described method, the whole captured image obtained by the image capture device 2, is scanned while the position (m, n) of the pixel of interest is horizontally or vertically shifted pixel by pixel in series, so that G and B components at an R pixel position, R and B components at a G pixel position, and R and G components at a B pixel position are calculated, whereby a full color image for one frame in which each pixel has all the color components can be obtained. In particular, regarding images taken by an imaging device such as a digital still camera, unlike CG images, the neighborhood of an edge in an image is often a low-chromatic shade (light and dark). Therefore, using the present invention, there is a benefit in that, while achieving full effects of the conventional method in the neighborhood of an edge contributing to resolutions image-quality deterioration such as black spots is eliminated in non-edge areas, even if fluctuations in capture, color signals arise due to noise, so that high-quality full-color images can be obtained.

Embodiment 2

Hereinafter, Embodiment 2 will be described in reference to drawings. The block diagram illustrating the entire configuration of Embodiment 2 is FIG. 1 as the case of Embodiment 1. Regarding the internal configuration, only the difference from Embodiment 1 is that the coefficient computing circuit 9 includes Formula 19 for calculating the coefficient K.

Next, the operation will be described. In the present embodiment, the computation in the coefficient computing circuit 9 is performed according to Formula 19.

[Expression 19]

$$K = \frac{(Dr - |J_{(m,n)} - J_{LPF}|) \times |J_{LPF} - H_{LPF}|}{M} \qquad \text{(Formula 19)}$$

Provided that K≧1, then K=1.

Here, M is expressed as M=Dr$^2$ in Embodiment 1, which has been used for normalizing the coefficient K. In the meanwhile, in Embodiment 2, after taking in advance into consideration of characteristics such as characteristics specific to the imaging system including the optical system and sensors, and noise characteristic due to sensitivity adjustments typified by analog gain adjustments, a user can select the M value (not correlated with the Dr). Namely, by selecting the M value in advance, the user of the image processing device can bias the value of the coefficient K toward 0 or toward 1.

Figure 8:
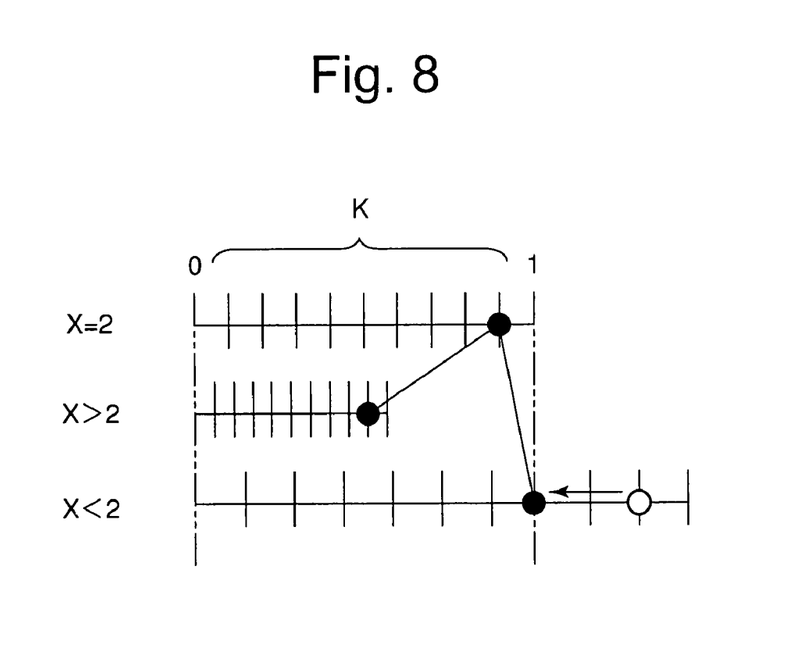
FIG. 8 is diagram illustrating effects of changing a constant term M in Embodiment 2 on interpolation calculation from J(m, n) and $J_{LPF}$.

FIG. 8 is a diagram illustrating cases in which, when the constant term M in Formula 19 in the present embodiment is changed, the value of K is biased toward 0, and is biased toward 1. The diagram illustrates situations in which the constant term M is changed in exponential of Dr as an example. In the diagram, the values of K are indicated separately divided into cases of X=2, X>2, and X<2 for M=Dr$^x$.

The coefficient K is limited to the scope of $0 \leq K \leq 1$. The larger the exponent x of the Dr (Dr>1), the larger the M value, and the larger the denominator, so that the coefficient K in Formula 19 is likely to be saturated to 0. By increasing the M value to perform adjustment so that the coefficient K is likely to be saturated to 0, Formula 10 can be largely affected by the $J_{(m, n)}$ (the method described in the conventional technology 2). Specifically, as illustrated in FIG. 8, there are cases in which, when X=2 for the M, the value of the coefficient K is 0.9, and when X>2, the value is 0.5.

In the meanwhile, the smaller the exponent x of the Dr (>1), the smaller the M value, so that the coefficient K in Formula 19 is likely to be saturated to 1. By decreasing the M value to perform adjustment so that the coefficient K is likely to be saturated to 1, Formula 10 is largely affected by the $J_{LPF}$ (the linear interpolation method in the conventional technology 1). Specifically, as illustrated in FIG. 8, there are cases in which, when X=2 for the M, the value of the coefficient K is 0.9, and when X<2, the coefficient K is calculated as 1.3, but because $K \geq 1$, the coefficient K is determined as 1.

As described above, in the present Embodiment 2, by defining the coefficient K in the coefficient computing circuit 9 in FIG. 1 as in Formula 19, after taking in advance into consideration of characteristics such as characteristics specific to the imaging system including the optical system and sensors, and noise characteristic due to sensitivity adjustments typified by analog gain adjustments, a user can select the constant M, so that image processing can be performed in which the most appropriate balance between the color interpolation result with a high regard for high resolutions and less false-color effects, and the color interpolation result with a high regard for anti-noise performance for dark portions or the like is taken into consideration.

Embodiment 3

Figure 9:
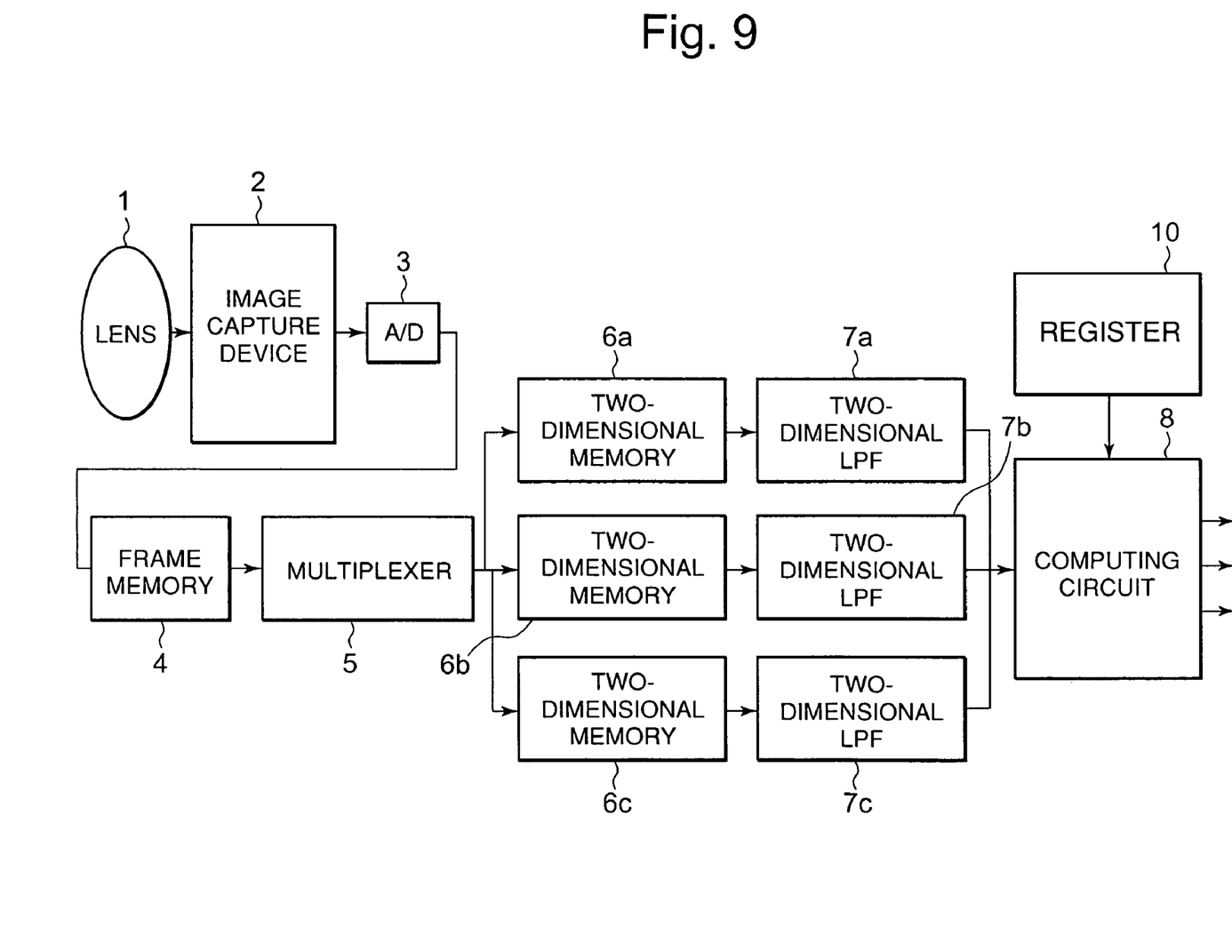
FIG. 9 is an entire block diagram in Embodiment 3 of the present invention.

Hereinafter, Embodiment 3 will be described in reference to a diagram. FIG. 9 is a block diagram illustrating the entire configuration of Embodiment 3. Regarding the internal configuration, the difference from the conventional technologies is that Formula 10 is used in the computing circuit 8 for performing computation for color interpolation and a register 10 for providing the coefficient K in Formula 10 is added to the computing circuit.

In the operation in Embodiment 3, the coefficient K in Formula 10 is directly given in advance as a constant. In this regard, Embodiment 3 is different from Embodiment 1 in which the coefficient K is dynamically calculated from Formula 9, and is different from Embodiment 2 in which a user selects the M to dynamically calculate the coefficient K from Formula 19.

The coefficient K in this case can be changed for each image in accordance with imaging conditions as in Embodiment 1 and Embodiment 2. In Embodiment 3, however, unlike Embodiment 1 and Embodiment 2, a common coefficient K is used within an image. Because this saves providing the coefficient computing circuit 9, there is a benefit in that the circuit size (the processing time and the amount of program codes in case of an implementation by software) can be reduced, so that price reduction of the device and speeding up of the processing can be achieved.

In Embodiment 1 and in Embodiment 2, although the device is so configured that the computation for the color interpolation in Formula 10 is performed for the entire image, the configuration is not limited to that. Specifically, because it is when signal levels of capture colors are low that white spots or black spots are generated by using the method described in the conventional technology 2, for image areas in which LPF output values of capture colors are a predetermined level or larger, the method described in the conventional technology 2 can be used by setting K=0. In the meanwhile, for image areas in which LPF output values of capture colors are as predetermined level or smaller, a method based on the linear interpolation method in the conventional technology 1 can be used by setting K=0.

Moreover, in all the above-described embodiments, devices have been described, which are so configured that a single-plate sensor in which primary color filters are arranged in a Bayer pattern is used as an image capture device. However, the invention can be applied to devices using complementary color filters, and to devices using primary color filters of another arrangement (an arrangement utilizing N kinds of spectral sensitivity curves from first through N-th curves, or the like).

Furthermore, in all the above-described embodiments, it has been described that image signals are smoothed by the two-dimensional LPFs 7a through 7c as in the conventional technology 1. However, there are cases in which, instead of passing through LPFs, non-capture color signals corresponding to the interpolation color for the pixel of interest can be calculated based on capture color signals outputted from photoelectric transducers for the pixels surrounding the pixel of interest (not shown in the figure).

Moreover, although, in all the above-described embodiments, the image capture device has been described to have a square arrangement, even in a case in which an arrangement other than a square arrangement such as a honeycomb arrangement is used, similar effects can be achieved.

Furthermore, in all the above-described embodiments, the block configurations including only the color interpolation reprocessing as image processing after imaging have been described. When configuring an actual imaging device, however, it is obvious that similar effects can be achieved even if the color interpolation processing is combined with normally used processing such as automatic white-balance processing (white color correction), γ correction processing (correction for tone characteristic), filtering (edge enhancement or noise removal), and JPEG-compression processing (image data compression and storing).

Moreover, it is also obvious that similar effects can be achieved even if input/output interfaces such as an LCD interface (a liquid crystal interface for image display and confirmation), and a flash memory interface (captured-image storage media interface) are added.

Moreover, in all the above-described embodiments, a configuration has been described, in which, after image data having been photoelectric-converted in the image capture device 2 is digitized by the A/D conversion circuit 3, the image data for one frame is once stored in the frame memory 4. However, the configuration is not limited to that. Specifically the device can be so configured that the image processing including the color interpolation is performed in units of a pixel or of a plurality of lines in synchronization with data streams while images are taken.

Furthermore, although, in all the above-described embodiments, examples of configurations have been described, in which the color interpolation processing can be performed within an imaging device, the configuration is not limited to those. The color interpolation processing can be performed in any devices such as a personal computer or a color printer that can be connected to an imaging device directly or indirectly via a storage medium, and that handle images inputted via a single-plate sensor.

What is claimed is:

1. An image processing device for obtaining images from an image capture device in which photoelectric transducers are arranged in a two-dimensional plane, each of the photoelectric transducers having a spectral sensitivity curve selected from a group of N spectral sensitivity curves, each of the N spectral sensitivity curves corresponding to one of a group of N colors, the group of N spectral sensitivity curves including H-th and J-th spectral sensitivity curves that correspond to H-th and J-th colors, respectively, the image processing device comprising:

a first calculation circuit for calculating a first H-th non-capture color signal corresponding to a pixel of interest, the pixel of interest corresponding to a position in the two-dimensional plane at which is located a photoelectric transducer having the J-th spectral sensitivity curve, based on capture color signals for pixels surrounding the pixel of interest that are outputted from those photoelectric transducers having the H-th spectral sensitivity curve;

a second calculation circuit for calculating a second H-th non-capture color signal corresponding to the pixel of interest by:

calculating a J-th average capture color signal at the pixel of interest, and multiplying a signal for the J-th color captured at the pixel of interest by a ratio of the first H-th non-capture color signal from the first calculation circuit to the J-th average capture color signal corresponding to the pixel of interest; and a third calculation circuit for calculating a third H-th non-capture color signal corresponding to an interpolation of the H-th color for the pixel of interest using the first H-th non-capture color signal from the first calculation circuit and the second H-th non-capture color signal from the second calculation circuit.

2. An image processing device according to claim 1, wherein the third calculation circuit increases a contribution ratio of the first H-th non-capture color signal from the first calculation circuit when a signal-level difference between a signal level of the J-th capture color signal at the pixel of interest and a signal level of the J-th average capture color signal for the pixel of interest is small; and the third calculation circuit increases a contribution ratio of the second H-th non-capture color signal from the second calculation circuit when the signal-level difference between the signal level of the J-th capture color signal at the pixel of interest and the signal level of the J-th average color signal for the pixel of interest is large.

3. An image processing device according to claim 1, wherein the third calculation circuit increases a contribution ratio of the first H-th non-capture color signal from the first calculation circuit when the difference between the first H-th non-capture color signal from the first calculation circuit and the J-th average capture color signal for the pixel of interest is large; and the third calculation circuit increases a contribution ratio of the second H-th non-capture color signal from the second calculation circuit when the difference between the first H-th non-capture color signal from the first calculation circuit and the J-th average capture color signal for the pixel of interest is small.

4. An image processing device according to claim 1, wherein the third calculation circuit means increases a contribution ratio of the first H-th non-capture color signal from the first calculation circuit, when a signal-level difference between a signal level of the J-th capture color signal at the pixel of interest and a signal level of the J-th average capture color signal for the pixel of interest is small, and when the difference between the first H-th non-capture color signal from the first calculation circuit and the J-th average capture color signal for the pixel of interest is large; and the third calculation circuit increases a contribution ratio of the second H-th non-capture color signal from the second calculation circuit, when a signal-level difference between a signal level of the J-th capture color signal at the pixel of interest and a signal level of the J-th average capture color signal for the pixel of interest is large, and when the difference between the first H-th non-capture color signal from the first calculation circuit and the J-th average capture color signal for the pixel of interest is small.

5. An image processing device according to claim 1, wherein the third H-th non-capture color signal from the third calculation circuit is calculated by adding a result of multiplying the first H-th non-capture color signal from the first calculation circuit by a coefficient K ($0 \leq K \leq 1$) to a result of multiplying the second H-th non-capture color signal from the second calculation circuit by a coefficient (1−K).

6. An image processing device according to claim 5, wherein given that a capture color signal of a photoelectric transducer having a J-th spectral sensitivity curve for a pixel at a coordinate (m, n) of interest is $J_{(m,n)}$, the first H-th non-capture color signal from the first calculation circuit is $H_{LPF}$, the J-th average capture color signal for the pixel of interest is $J_{LPF}$, and a variable for keeping a coefficient K within a scope from 0 to 1 is Dr, the coefficient K is calculated according to:

$$K = \frac{(Dr - |J_{(m,n)} - J_{LPF}|) \times |J_{LPF} - H_{LPF}|}{Dr^2} \quad \text{[Formula 1]}$$

when the value of K is large; the third calculation circuit increases a contribution ratio of the first H-th non-capture color signal from the first calculation circuit, and when the value of K is small, the third calculation circuit increases a contribution ratio of the second H-th non-capture color signal from the second calculation circuit.

7. An image processing device according to claim 5, wherein given that a capture color signal of a photoelectric transducer having a J-th spectral sensitivity curve for a pixel at a coordinate (m, n) of interest is $J_{(m,n)}$, the first H-th non-capture color signal from the first calculation circuit is $H_{LPF}$, the J-th average capture color signal for the pixel of interest is $J_{LPF}$, a dynamic range is Dr, and M is a variable, a coefficient K for determining contributions of the calculation results of the first and second calculation circuits is calculated according to:

$$K = \frac{(Dr - |J_{(m,n)} - J_{LPF}|) \times |J_{LPF} - H_{LPF}|}{Dr^2} \quad \text{[Formula 2]}$$

when a higher priority is given to anti-noise performance, the third calculation circuit assigns a large value to the M, and when a higher priority is given to a high resolution, the third calculation circuit assigns a small value to the M.

8. An image processing method for obtaining images from an image capture device in which photoelectric transducers are arranged in a two-dimensional plane, each of the photoelectric transducers having a spectral sensitivity curve selected from a group of N spectral sensitivity curves, each of the N spectral sensitivity curves corresponding to one of a group of N colors, the group of N spectral sensitivity curves including H-th and J-th spectral sensitivity curves that correspond to H-th and J-th colors, respectively, the image processing method comprising a first calculation step for calculating a first H-th non-capture color signal corresponding to a pixel of interest, the pixel of interest corresponding to a position in the two-dimensional plane at which is located a photoelectric transducer having the J-th spectral sensitivity curve, based on capture color signals for pixels surrounding the pixel of interest that are outputted from those photoelectric transducers having the H-th spectral sensitivity curve;

a second calculation step for calculating a second H-th non-capture color signal corresponding to the pixel of interest by:

calculating a J-th average capture color signal at the pixel of interest, and multiplying a signal for the J-th color captured at the pixel of interest by a ratio of the first H-th non-capture color signal from the first calculation step to the J-th average capture color signal corresponding to the pixel of interest; and a third calculation step for calculating a third H-th non-capture color signal corresponding to an interpolation of the H-th color for the pixel of interest using the first H-th non-capture color signal from the first calculation step and the second H-th non-capture color signal from the second calculation step.

9. The image processing method according to claim 8, wherein the third H-th non-capture color signal from the third calculation step is calculated by adding a result of multiplying the first H-th non-capture color signal from the first calculation step by a coefficient K ($0 \leq K \leq 1$) to a result of multiplying the second H-th non-capture color signal from the second calculation step by a coefficient (1−K).

* * * * *